US006578765B2

(12) United States Patent  
Huss et al.

(10) Patent No.: US 6,578,765 B2  
(45) Date of Patent: Jun. 17, 2003

(54) OPTICAL SCANNING SYSTEM AND INTEGRATED OPTICS MODULE THEREFOR

(75) Inventors: Paul R. Huss, Rosewood, OR (US); Jorge L. Acosta, Eugene, OR (US); Christopher F. Sautter, Portland, OR (US); Todd F. Gotham, Sunnyvale, CA (US); Elmer G. Thielman, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/953,553

(22) Filed: Sep. 12, 2001

(65) Prior Publication Data

US 2003/0047608 A1 Mar. 13, 2003

(51) Int. Cl.[7] .............................. G06K 7/10; G06K 7/14
(52) U.S. Cl. ....................................................... 235/454
(58) Field of Search .................................. 235/462, 454

(56) References Cited

U.S. PATENT DOCUMENTS

| | | | |
|---|---|---|---|
| 4,678,288 A | 7/1987 | Lonsdale et al. ........... 350/432 |
| 4,694,182 A | 9/1987 | Howard ....................... 250/566 |
| 4,786,798 A | 11/1988 | Lonsdale ...................... 250/216 |
| 4,794,240 A | 12/1988 | Schorr et al. ................ 235/467 |
| 4,939,356 A | 7/1990 | Rando et al. ................ 235/467 |
| 5,007,691 A | 4/1991 | Bobba et al. ................ 350/6.7 |
| 5,115,120 A | 5/1992 | Eastman ...................... 235/462 |
| 5,146,463 A | 9/1992 | Rando ......................... 372/24 |
| 5,256,864 A | 10/1993 | Rando et al. ................ 235/462 |
| 5,475,207 A | 12/1995 | Bobba et al. ................ 235/467 |
| 5,491,328 A | 2/1996 | Rando ......................... 235/462 |
| 5,565,668 A | 10/1996 | Redderson et al. ......... 235/462 |
| 5,693,930 A | 12/1997 | Katoh et al. ................. 235/467 |
| 5,708,262 A | 1/1998 | Goldman et al. ........... 235/492 |
| 5,841,121 A | 11/1998 | Koenck ....................... 235/472 |
| 5,869,827 A | 2/1999 | Rando ...................... 235/462.4 |
| 6,000,619 A | 12/1999 | Reddersen et al. ..... 235/462.45 |
| 6,056,198 A | 5/2000 | Rudeen et al. ......... 235/462.24 |
| 6,152,372 A | 11/2000 | Colley et al. ........... 235/472.01 |
| 6,257,492 B1 * | 7/2001 | Bressler et al. ........ 235/462.43 |
| 6,273,336 B1 | 8/2001 | Rudeen et al. ......... 235/462.24 |
| 6,290,135 B1 | 9/2001 | Acosta et al. .......... 235/472.01 |
| 6,303,927 B1 | 10/2001 | Ahten et al. ................ 250/234 |
| 6,347,744 B1 * | 2/2002 | Metlitsky ............... 235/472.02 |
| 6,360,949 B1 * | 3/2002 | Shepard et al. ........ 235/462.43 |

* cited by examiner

Primary Examiner—Michael G. Lee  
Assistant Examiner—Lisa M. Caputo  
(74) Attorney, Agent, or Firm—Stoel Rives LLP (57) ABSTRACT

An integrated optics module for an optical scanning system that includes a scanning mechanism that generates a scan pattern from a laser beam is provided. The module includes an optics block, a laser mounted on the optics block, routing optics mounted on the optics block in the path of the laser beam emitted from the laser, a collection lens disposed on a surface of the optics block, and mounting fixtures configured to mount the optics module to the scanner housing in a fixed position. The routing optics are configured to route the laser beam through the collection lens toward the scanning mechanism when the module is mounted in the scanner system. If the laser beam routed through the collection lens is pre-aligned, no additional scanner system optical alignment is required when the optics module is mounted into the scanner housing.

30 Claims, 5 Drawing Sheets

OPTICAL SCANNING SYSTEM AND INTEGRATED OPTICS MODULE THEREFOR

BACKGROUND OF THE INVENTION

The field of the present invention relates to data reading systems and methods of data reading, and in particular a pre-alignable and interchangeable optics module for use in a data reading system.

Data readers such as bar code scanners, are used in a wide range of retail, commercial and industrial applications to read optical codes on numerous items for purposes such as point of sale (POS) check-out, product inventory and item tracking. Scanners may generally be classified into two categories: fixed scanners, such as counter top scanners for checkout applications, and hand held scanners, which are used for retail checkout as well as many inventory and tracking applications.

Regardless of the application, laser beam scanners typically have an optical system composed of a low power laser source which projects a laser beam; mirrors to direct the laser beam; beam forming devices such as focussing lens or apertures to develop the correct laser beam diameter; a scanning mechanism such as a drive assembly comprising a rotating polygon mirror, a reciprocating mirror, or a holographic element to scan the laser beam at a package label and illuminate the bars and spaces of a bar code symbol; a collection element such as a lens or mirror to gather the diffused light reflected from the label; and a detector to convert the reflected light into an analog signal for subsequent digital decoding.

Laser beam scanners have been manufactured such that the scanner's final assembly involved directly attaching the various optical components on the scanner housing in a plurality of assembly steps or attaching the components to scanner subassemblies for subsequent assembly to the scanner housing. Regardless of the assembly sequence, in the past, there were a number of optical elements made adjustable at final scanner assembly, such as the routing or pattern mirrors, by which the laser light was aligned. These mirrors were required to be adjusted after assembly of the subassembly or even after final scanner assembly so that a desired scan pattern would be produced for exiting the scanner. Also, the adjustments were necessary to optically align the returning light reflected from a bar code symbol with the scanner's collection lens and photodetector for gathering the optical data. To achieve the necessary alignment, adjustments were typically made on two to six mirrors after final assembly. For example, in a scanner such as the Magellan® SL scanner of PSC Inc. of Eugene, Oreg. the motor/polygon scan mirror assembly and the VLDM assembly are mounted in fixed, pre-aligned positions, but both a routing mirror and beam splitter disposed in the beam paths between the VLDM and the polygon mirror are each mounted on respective bendable metal frames which may be bent providing optical alignment adjustment after final assembly.

Furthermore, in some scanners, if the laser source becomes inoperative after the scanner's final assembly alignment, the scanner is repaired by replacing the defective light source after which another optical alignment has to be performed. The optical alignment following replacement of the defective laser is necessary because the pointing error of one laser source to another laser source is not the same. As a result, after the laser is replaced with a new unit, either the desired scan geometry exiting the scanner is lost or the returning light is no longer aligned with the collection lens and the photodetector, or both.

The pointing error, which is the deviation of the projected laser beam from perfect, varies from one laser diode to another because, for example, the chip location inside the diode casing is not consistent. The imperfect position and concentricity of the focussing lenses forming the laser beam may further aggravate the pointing error variance between laser diodes. Furthermore, it is currently too expensive to design and consistently manufacture a laser source, such as a laser diode or laser tube, having a sufficiently small pointing error so as to eliminate the need to perform the scanner assembly alignment.

In sum, where the light source fails after final scanner alignment, a second scanner assembly alignment has been necessary after replacing the defective laser source. As a result, if a scanner unit fails in the field, it must either be returned to the factory for servicing or the optics of the scanner must be aligned in the field. Replacing a defective light source in the field is difficult because special tooling and a trained technician are required. Consequently, to date, replacement of defective laser sources has been both costly and time consuming.

SUMMARY OF THE INVENTION

In a preferred embodiment of the invention, an integrated optics module capable of pre-alignment is provided. The integrated optics module is designed for use in an optical scanning system that includes a scanning mechanism for generating a scan pattern from a laser beam. By pre-aligning the optics module, the need for scanner re-alignment when components are changed in and out of the scanner is eliminated. As a result, if the laser source on an optics module fails, the optics module may be replaced with a new optics module and the scanning system will remain operational without the need for performing an optical alignment on the individual components of the system.

In another preferred embodiment, the optics module includes an optics block, a laser mounted on the optics block, routing optics mounted on the optics block in the path of the laser beam emitted from the laser, a collection element such as a collection lens disposed on a surface of the optics block, and mounting fixtures. The mounting fixtures are designed to removably mount the optics block to the scanner housing in a fixed position so that the optics block has a predetermined orientation in relation to the scanning mechanism.

In another preferred embodiment, a printed circuit board, such as the analog board, having a photodetector mounted thereon is mounted on the optics block to insure that the collection element is aligned with the photodetector from one optics module to another.

Further objects, features, and advantages of the invention will be better understood from the following description considered in connection with the accompanying drawings in which various embodiments of the invention are illustrated by way of example.

DETAILED DESCRIPTION OF THE PREFERRED EMBODIMENT

Preferred embodiments will now be described with reference to the drawings. To facilitate description, any reference numeral representing an element in one figure will represent the same element in any other figure.

Figure 1:
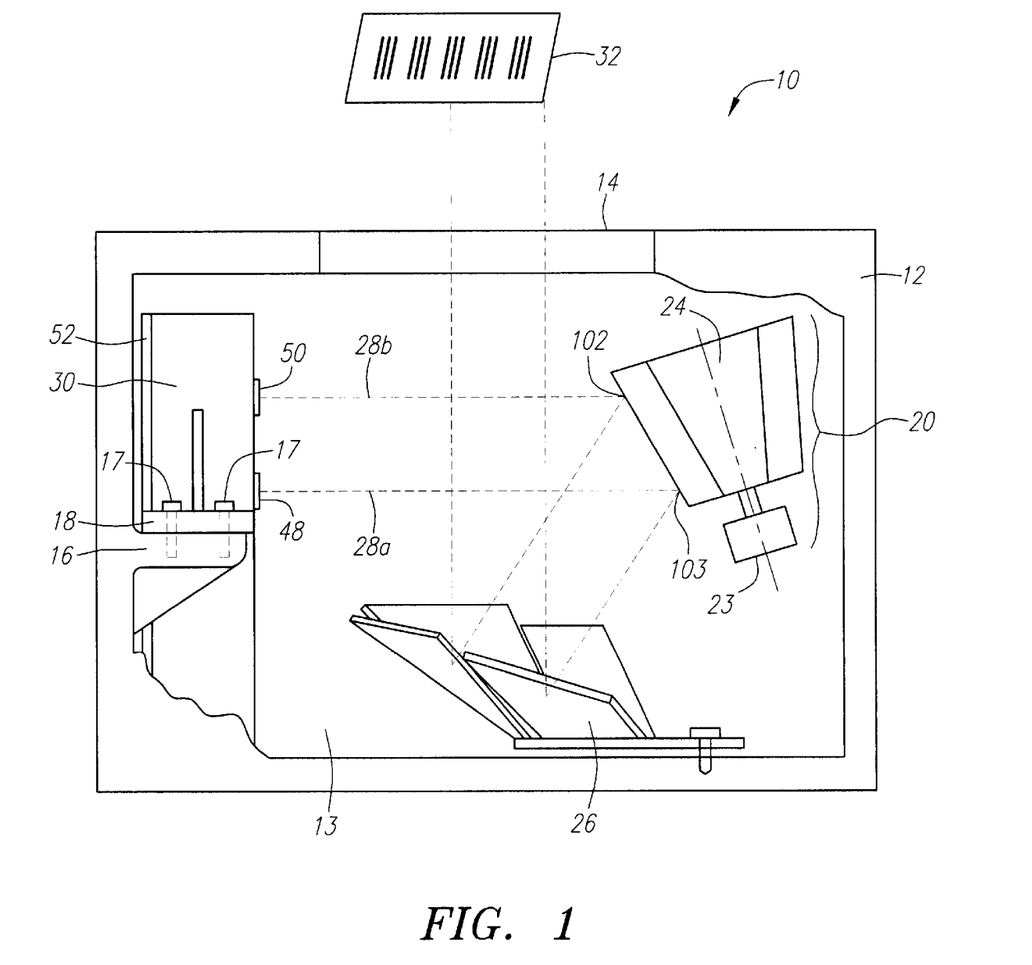
FIG. 1 is a diagrammatic plan view of a bar code scanner system according to a preferred embodiment.

FIG. 1 illustrates an optical scanning system 10 comprising a scanner housing 12, an optics module 30, and a scanning mechanism 20. The scanner housing 12 is at least partially enclosed and includes a transmissive window 14 and one or more mounting fixtures 16.

In the operation of the optical scanning system 10, the optics module 30 emits laser beams 28a, 28b onto scanning mechanism 20. A lesser or greater number of beams could be emitted from the optics module 30 onto the scanning mechanism 20. The two beams 28a, 28b are shown by way of example only. The scanning mechanism 20 generates a scan pattern from the emitted laser beams that is projected out of the scanner housing 12 through the transmissive window 14, and onto a bar code symbol 32 for reading. The returning light reflected from the bar code symbol 32 is retrodirectively collected by the collection devices of the optics module 30 and is then converted into electrical signals and processed by a processing system (not shown) for decoding.

The scanning mechanism 20 comprises a motor 23 and a rotating polygon mirror 24 that scans the beams 28a, 28b across pattern mirrors 26 in a predetermined pattern. The scanning mechanism 20 and the pattern mirrors 26 may be mounted within the housing 12 using a suitable technique. The location and angle at which the beams 28a, 28b impinge on the scanning mechanism 20 determine the scan pattern produced by the scanning mechanism 20 and the pattern mirrors 26. Accordingly, it is critical that the optics module 30 has its optical elements precisely aligned such that when installed in the scanner, the optics module 30 emits each of the beams 28a, 28b onto a predetermined location of the scanning mechanism 20, and at a predetermined angle.

The optics module 30 includes various transmission and collection devices. The module 30 is removably mounted within the housing 12 in a fixed, or predefined, position so that the optics block has a predetermined orientation in relation to the scanning mechanism 20. More particularly, the optics module 30 is mounted so that a pre-selected axis of each of the collection elements, in this embodiment collection lenses 48 and 50, intersects the rotating polygon mirror 24 at a predetermined location and angle. In turn, each of the laser beams 28a, 28b is emitted through a respective collection lens along the pre-selected axis of the collection lens so that the beam impinges on the rotating polygon mirror 24 at the desired location. As a result, the need to align the scanning components upon mounting of the optics module 30 to the housing 12 is eliminated, since the components are pre-aligned in the optics module 30.

The optics module 30 is removably mounted in its fixed position within the housing 12 by mounting the module 30 to the mounting fixtures 16. The scanner housing mounting fixtures 16 are designed to be complementary to mounting fixtures 18 provided on optics module 30. The mounting fixtures 16, 18 may for example, comprise mounting brackets that are bolted together with bolts 17 as best seen in FIG. 1. The mounting fixtures 16, 18 are configured so that, when attached to one another, the optics module 30 is automatically positioned, within acceptable tolerances, in its predefined position within the housing 12. Accordingly, the mounting fixtures 16, 18 are fixed-position type mounting fixtures rather than adjustable type mounting fixtures.

Figure 2A:
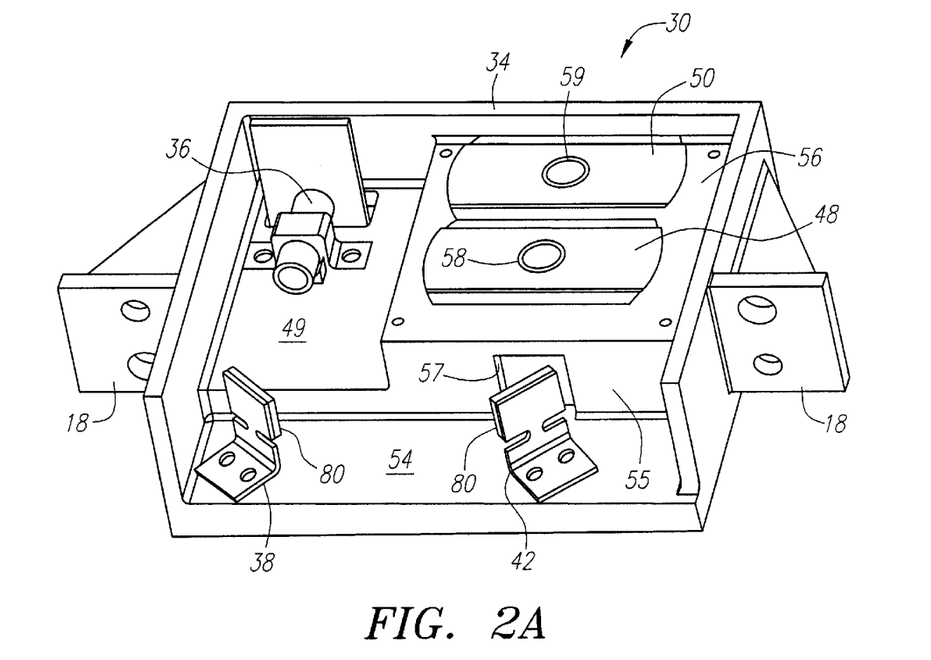
FIG. 2A is a perspective view of an integrated optics module according to a first preferred embodiment.
Figure 2B:
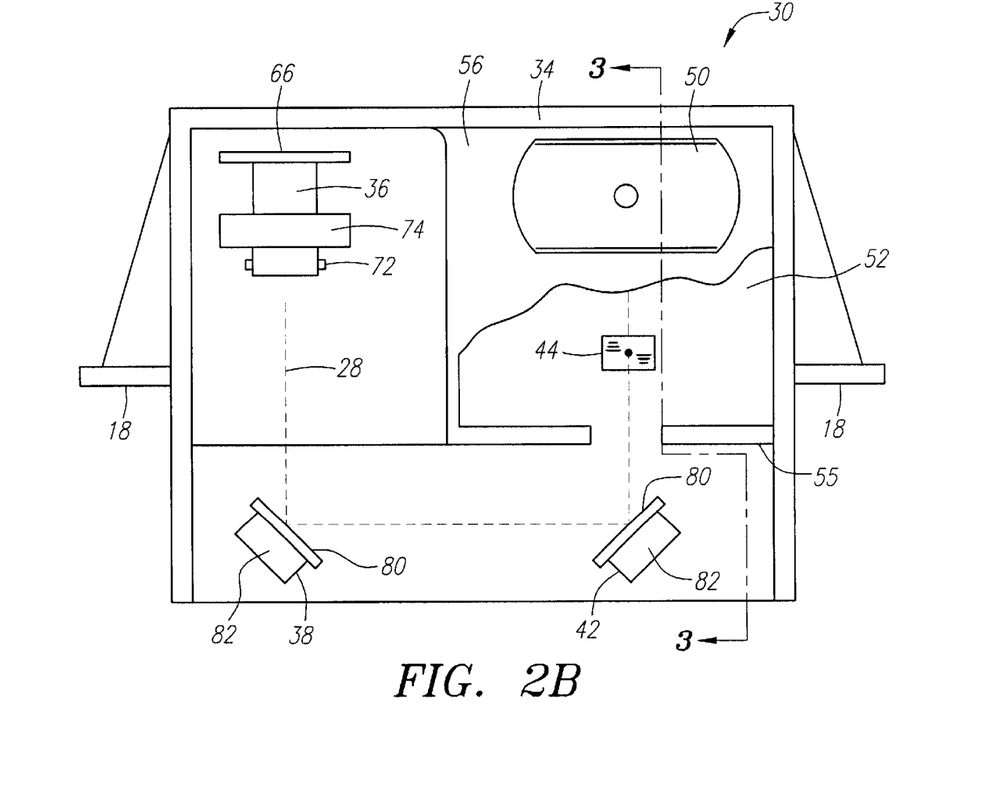
FIG. 2B is a partial diagrammatic top plan view of the integrated optics module shown in FIG. 2A.
Figures 3, 4:
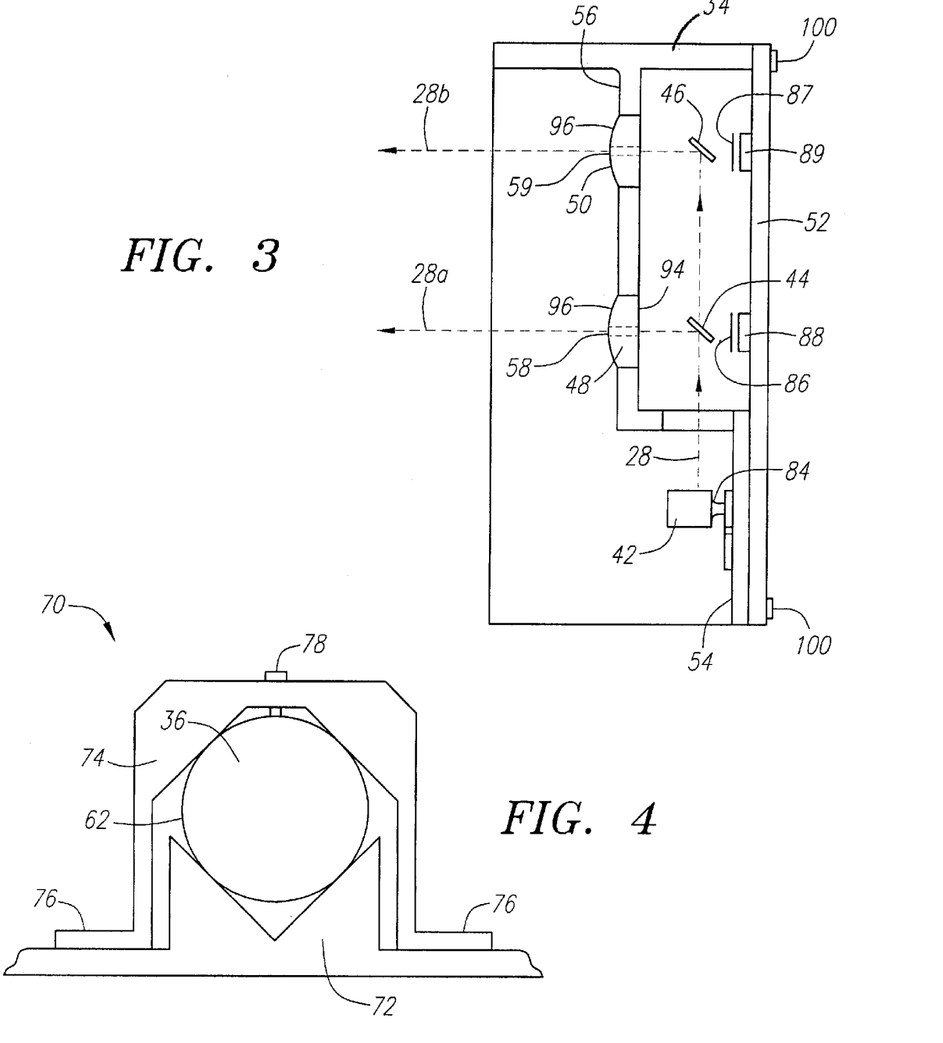
FIG. 3 is a diagrammatic cross-sectional view of FIG. 2B taken along line 3—3.
FIG. 4 is a diagrammatic plan view of a laser source mounting system that may be employed in the optics module according to a preferred embodiment.

FIGS. 2A, 2B and 3 further illustrate the optics module 30 according to the present embodiment. The optics module 30 includes an optics block 34 onto which a laser source 36, routing optics 38, 42, 44, 46, and collection lenses 48, 50 are mounted. In a preferred implementation, a printed circuit board shown as analog board 52 is also mounted to the optics block 34 and forms part of the module 30.

The optics block 34 is essentially a chassis or support for the laser, routing optics, collection lenses, and, optionally, the analog board. The optics block 34 may be made from any suitable structural metal or plastic. For example, optics block 34 may be made from aluminum or an optical plastic such as acrylic or polystyrene. If optics block 34 is made from an optical plastic, then collection lenses 48, 50 may be integrally molded into the optics block.

The optics block 34 may have any configuration suitable to support the various optical components so that the laser beams 28a, 28b are routed through the collection lenses 48, 50. In the illustrative embodiment shown in FIGS. 2A, 2B and 3, for example, the optics module 30 comprises an optics block 34 that has three planar mounting surfaces 49, 54, and 56 that are parallel to one another.

FIGS. 2A, 2B and 3 illustrate a preferred arrangement for mounting the optical components of the optics module 30 to the mounting surfaces of optics block 34. The optics module's 30 transmission devices comprise laser source 36, routing optics or mirrors 38, 42, beam splitter 44, and fold mirror 46. The laser source 36 is mounted on the planar mounting surface 49, which falls between planar mounting surfaces 54 and 56. The routing mirrors 38, 42 are mounted on the planar mounting surface 54 of the optics block 34. The beam splitter 44 is mounted on a first side of the first collection lens 48 in a suitable manner. In a similar manner, the fold mirror 46 is mounted on a first side of the second collection lens 50. The collection lenses 48, 50 are preferably mounted in the planar mounting surface 56 in such a manner that, when the optics block 34 is mounted in the housing 12, a pre-selected axis of each of the collection lenses 48, 50 intersects the rotating polygon mirror 24 at a predetermined location. Preferably the pre-selected axis of each lens is the principal axis of the lens.

In the operation of the optics module 30, the laser source 36, such as a laser diode or laser tube, produces a laser beam 28. The routing mirrors 38, 42 disposed in the path of the laser beam 28 route the beam to the beam splitter 44 through an opening 57 provided in the wall 55. The beam splitter 44 splits the laser beam 28 into a first beam 28a and a second beam 28b. Simultaneously, the beam splitter 44 reflects or routes the first beam 28a through a first center area 58 of the collection lens 48. The second beam 28b passes through the beam splitter 44 and is reflected, or routed, by routing mirror 46 through a second center area 59 of the second collection lens 50.

Routing mirrors 38, 42, 44 are configured to route beam 28a through collection lens 48 substantially along the pre-selected axis of collection lens 48. Similarly, routing optics 38, 42, 44 and 46 are configured to route beam 28b through collection lens 50 substantially along the pre-selected axis of collection lens 50. Accordingly, when the optics module 30 is mounted in the housing 12, laser beams 28a and 28b will be routed through collection lenses 48, 50 so that they intersect with the scanning mechanism 20 at their respective predetermined locations.

As noted above, the pre-selected axis of each collection lens 48, 50 preferably comprises the principal axis of the lens. Furthermore, the center areas 58, 59 formed in the collection lenses 48, 50 preferably each comprise an aperture formed through the collection lens concentrically with the principal axis of the lens.

Figure 5:
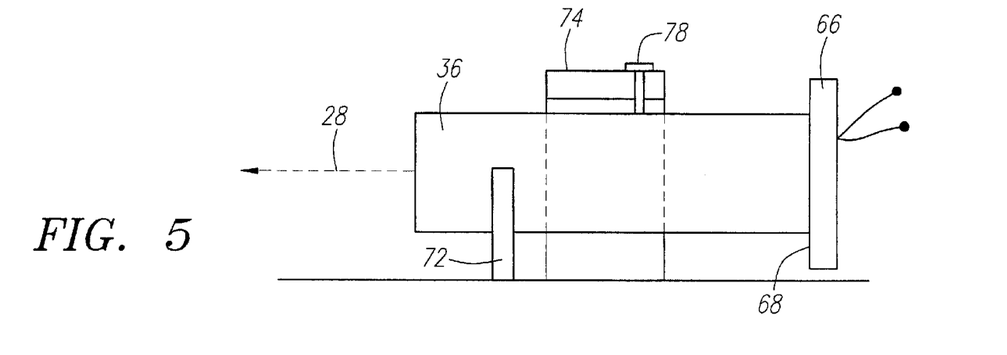
FIG. 5 is a diagrammatic side view of the laser source mounting system of FIG. 4.

FIGS. 4 and 5 illustrate a preferred mounting system 70 for securing the laser source 36 to the optics block 34. The laser beam 28 is emitted from the proximal end 62 of the laser source 36. A laser PC board 66 is affixed to and is electronically coupled to the distal end 68 of the laser source 36. The mounting system 70 comprises a lower support 72 and an upper bracket 74. The lower support 72 includes a V-notch to support the laser source 36. The upper bracket 74 is generally U-shaped and includes two mounting flanges 76, 76. The mounting flanges 76, 76 are adapted to receive securing means for mounting the flanges 76 to the optics block 34 and securing the laser source 36 against the lower support 72. The securing means may comprise screws, straps, adhesives, or any other suitable fasteners. Although the outer contour of the laser source 36 is illustrated as having a generally cylindrical shape, the mounting system 70 may be adapted to secure any outer contour. For example, if the laser source contour is rectangular, the contacting surfaces of the lower support 72 and the upper bracket 74 may be adapted to conform to a rectangular configuration for mounting onto the optics block.

To provide adjustment capability for aiming the laser beam 28 emitted from the laser source 36, the upper bracket 74 may be adapted to receive an adjustment screw 78. As shown in FIG. 5, the lower support 72 and the upper bracket 74 are spaced apart such that the adjustment screw 78 may tilt the proximal end 62 of the laser source 36 up or down. Though only one adjustment screw 78 is shown, multiple adjustment screws may be disposed about the perimeter of the laser source 36 to provide greater laser aiming adjustment capability.

In the preferred embodiment of the optics module 30 illustrated in FIGS. 2A, 2B and 3, the routing mirrors 38, 42 are adjustable and the beam splitter 44 and the fold mirror 46 are fixed, or non-adjustable. The routing mirrors 38, 42 each include a reflective surface 80, a mounting base 82, and a narrow neck 84 disposed between the reflective surface 80 and the mounting base 82. The routing mirrors 38, 42 are disposed on the optics block 34 such that their reflective surfaces 80 are in the path of the emitted laser beam 28. The mounting base 82 is used to secure the routing mirrors to the optics block 34. The mounting base 82 may include apertures adapted to receive bolts, screws, rivets or any other fasteners suitable for securing the routing mirrors 38, 42 to the optics block 34. Alternatively, the mounting base 82 may serve as a contact surface for other suitable securing means such as adhesive, epoxy, clips or pins.

The neck 84 of each of the routing mirrors 38, 42 advantageously allows multi-axial movement of the reflective surface 80 to align the laser beam 28 thereby controlling the position of the laser beams 28a, 28b exiting the optics module 30 after reflecting off of the beam splitter 44 or the fold mirror 46. The positioning of each of the routing mirrors 38, 42 may be achieved by manually bending the neck 84 to position the reflective surface 80 at the desired orientation relative to the laser beam 28 emitted from laser 36. Other suitable adjusting means, such as set screws, pins, or shims may also be employed. However, a routing mirror having a neck configuration as described herein provides a convenient and effective way to orient the reflective surface 80. Whatever design is used to provide adjusting capabilities, the routing mirrors are preferably constructed and arranged to hold their position once the beam alignment is made.

As already described, the embodiment illustrated in FIGS. 2B and 3 includes a beam splitter 44 and a fold mirror 46 that are non-adjustable. These routing optics may be mounted to the optics block 34 by any suitable fastening means, including for example, screws, bolts, or adhesive. Epoxy, for example, may be used to bond the beam splitter 44 and the fold mirror 46 to the back of collection lenses 48, 50, respectively. The proper tilt or angle of the beam splitter 44 and the fold mirror 46 may be achieved by pinning, shimming or any other suitable method. For example, the beam splitter 44 and the fold mirror 46 may be attached to pre-formed mounting fixtures provided on the first side of the collection lenses 48, 50.

Though FIGS. 2A, 2B and 3 illustrate routing optics comprising two routing mirrors 38, 42 and two fixed mirrors 44, 46, it is not necessary to use this particular routing optics configuration. For example, the routing optics may comprise a greater or lesser number of routing mirrors to direct the laser beam 28 to the desired location. The routing optics typically, however, will include at least one adjustable optical component configured to permit the adjustment of the alignment of the laser beam routed through the collection lenses. Preferably the routing optics include at least two adjustable routing mirrors as shown in the illustrated embodiment so that both translational and angular error can be removed from the laser beam prior to being routed through the collection lenses. Depending on the configuration of the optics module, the optics module may also comprise more or less than four routing components.

Figure 6:
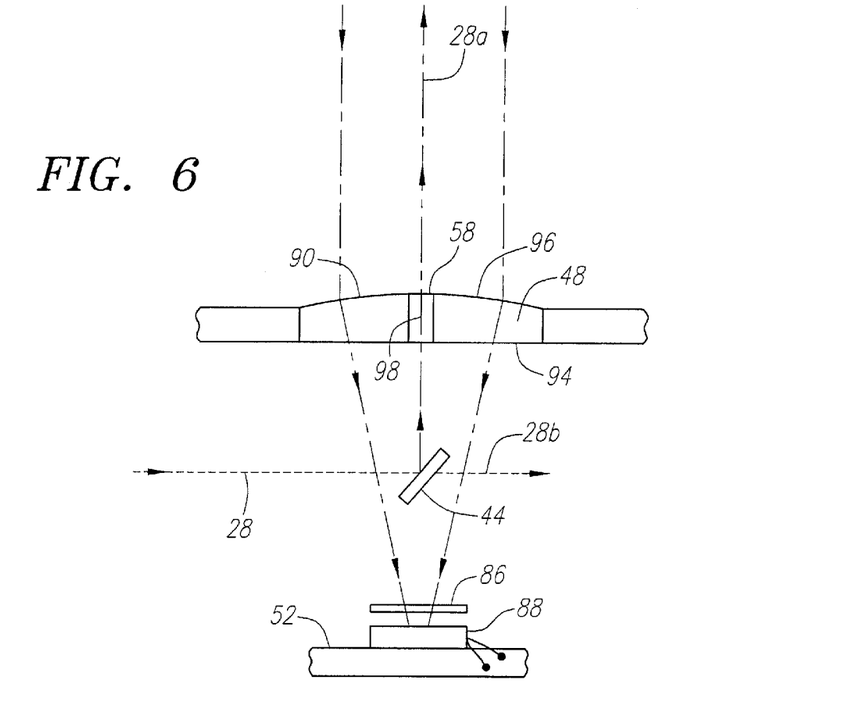
FIG. 6 is diagrammatic view illustrating retrodirective collection of reflected light by the optics module of FIGS. 2A and 2B.

Turning to FIGS. 3 and 6, the collection devices included in the optics module 30 will now be described. In a preferred embodiment, the collection devices comprise collection lenses 48, 50 and their corresponding photodetectors 88, 89. FIG. 3 illustrates the arrangement of collection lenses 48, 50 to photodetectors 88, 89, optional bandpass filters 86, 87, routing optics 44, 46 and exiting laser beams 28a, 28b. FIG. 6 is an enlarged view of the collection devices associated with collection lens 48 and is provided to better illustrate the physical relationship between collection lens 48, beam splitter 44, exiting beam 28a, photodetector 88, and optional bandpass filter 86.

As shown in FIG. 3, the beam splitter 44 is interposed between the collection lens 48 and the optional bandpass filter 86, as well as the photodetector 88. In addition, analog board 52 is mounted to the optics block 34 so that photodetector 88 is facing the first side 94 of collection lens 48 and is positioned to receive light transmitted through the collection lens from the second side 96 of the collection lens. The photodetector 88 is mounted on analog board 52 so that when the analog board 52 is attached to the optics block 34, the photodetector 88 is positioned a predetermined distance from the collection lens 48 along the pre-selected axis, which in the illustrated embodiment corresponds with the principal axis of the collection lens 48. As shown in FIG. 6, the principal axis 98 of the collection lens 48 is the axis that extends through the center of the lens and is perpendicular to the lens plane. The photodetector 88 is preferably positioned at the principal focus of the collection lens 48.

As illustrated in FIG. 6, the collection lens 48 is a converging type lens and includes a lens area 90, a center area 58, a first side 94, and a second side 96. The lens area 90 is disposed outside the central area 58 and collects and focuses returning light reflected from the bar code symbol 32 to the photodetector 88. The center area 58 transmits the exiting laser beam 28a and is preferably concentric with the principal axis 98 of the collection lens.

The first side 94 of the collection lens 48 faces the photodetector 88 and the second side 96 faces the scanning mechanism 20 that is shown in FIG. 1.

Collection lens 48 is disposed in planar surface 56 of the optics block 34 such that the laser beam 28a reflected from the beam splitter 44 passes through the center area 58 from the first side 94 of the collection lens 48 to the second side 96 of the collection lens. The exiting beam 28a may be aligned to the principal axis 98 by adjusting the routing mirrors 34, 42 as described above. Aligning the laser beam 28a to the principal axis 98 of the collection lens 48 provides a relationship whereby controlling the orientation and position of the collection lens 48 controls the position of the exiting laser beam 28a projecting out from the optics module 30.

In a preferred embodiment, the center area 58 of the collection lens 48 comprises an exiting channel for laser beam 28a. However, the center area 58 may alternatively comprise laser forming or shaping optics, such as a lens or aperture, to form the laser beam to a desired diameter.

The collection lens 48 may be mounted in planar surface 56 of optics block 34 by any suitable fastening method. For example, the collection lens may be secured in a corresponding aperture provided in the optics block using, for example, screws, bolts, adhesive or epoxy. Alternatively, the lens may be integrally molded in the optics block 34 if the optics block is made from an optical plastic, such as acrylic or polystyrene. Though either fastening method is sufficient, integrally molding the collection lens in an optics block 34 made from optical plastic is preferred as it advantageously simplifies the construction of the optics module 30 by, among other things, eliminating the step of fastening or bonding the collection lens to the optics block.

By having the exiting laser beam 28a substantially aligned with the principal axis 98 of the collection lens 48, the collection lens 48 is automatically in an optically aligned position when mounted in scanning system 10 to collect the returning retrodirective light from the bar code symbol 32. The returning retrodirective light from the second side 96 of the collection lens 48 is filtered through bandpass filter 86 and focused onto the collection area of the photodetector 88 disposed behind the beam splitter 44.

The analog board 52 includes holes 100 adapted to receive screws or any other fasteners suitable for securing the analog board 52 to the optics block 34. Regardless of the type of fasteners used, the analog board 52 is mounted to the optics block 34 such that the collection area of the photodetector 88 is sufficiently aligned with the principal axis 98 of the collection lens 48. Preferably, the photodetector 88 is also spaced from the collection lens 48 at approximately the principal focus of the collection lens. To better control the position of the photodetector 88 in relation to the collection lens 48, alignment pins or other suitable means may be employed to mount the analog board 52 to the optics block 34.

It should be noted that the illustration of FIG. 6 and the discussion above may also apply to the relationship between the collection lens 50, the exiting beam 28b, bandpass filter 87, and photodetector 89. As a result, the return light from the second laser beam 28b is retrodirectively collected by the collection lens 50 disposed in surface 56 of the optics block 34 and focused on photodetector 89.

Figure 7:
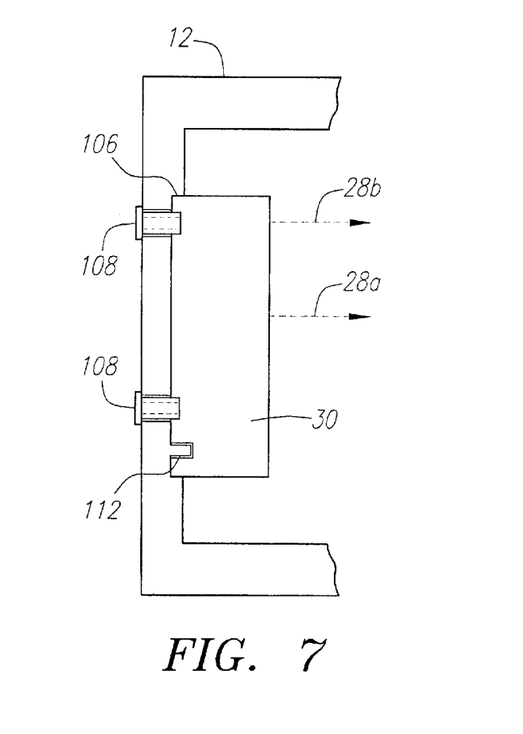
FIG. 7 is a diagrammatic view illustrating a first alternative optics module mounting fixture.
Figure 8:
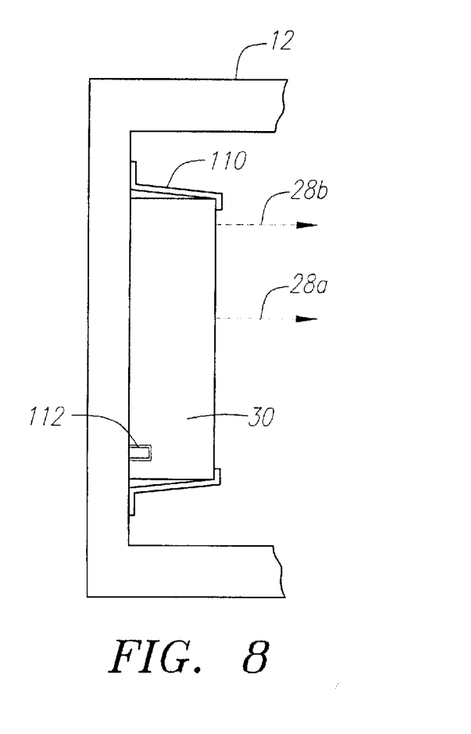
FIG. 8 is a diagrammatic view illustrating a second alternative optics module mounting fixture.

Turning back to FIGS. 1, 2A, 2B and 3, the optics block 34 is provided with mounting fixtures 18 on opposing sides of the optics block to mount the optics module 30 to complementary mounting fixtures 16 provided on the inner wall of scanner housing 12. The optics block 34 is mounted within the optics module 30 such that the second side 96, 96 of the collection lenses 48, 50 face the scanning mechanism 20 and the principal axes of the collection lenses 48, 50 intersect the scanning mechanism 20 at predetermined locations 102, 103 on the rotating polygon mirror 24. By positioning the collection lenses 48, 50 as just described, the exiting beams 28a, 28b, each being aligned to the principal axis of its respective collection lens, will also intersect the scanning mechanism 20 at locations 102, 103. Mounting fixtures 16, 18 are adapted to receive removable fasteners 17, such as bolts, screws, or other removable fasteners for releasably affixing the optics module 30 to the scanner housing 12. Though flange-type mounting fixtures 16, 18 have been illustrated in connection with the embodiment of the optics module 30 shown in FIGS. 1–3, any suitable mounting fixture that removably affixes the optics module 30 in its appropriate orientation within housing 12 may be used. For example, as shown in FIG. 7, a recess 106 in scanner housing 12 may be used in combination with screws 108. Alignment pins 112 may also be used to further ensure the proper orientation of optics module 30 within the scanner housing 12. Alternatively, clips 110 may be used to removably mount optics module 30 to the scanner housing 12 as shown in FIG. 8. To control the alignment of the optics module 30 so that the principal axes of the collection lenses intersect the scanning mechanism 20 in the predetermined locations on rotating polygon mirror 24, alignment pins 112 or other suitable means to align mating components may be employed.

Figure 9:
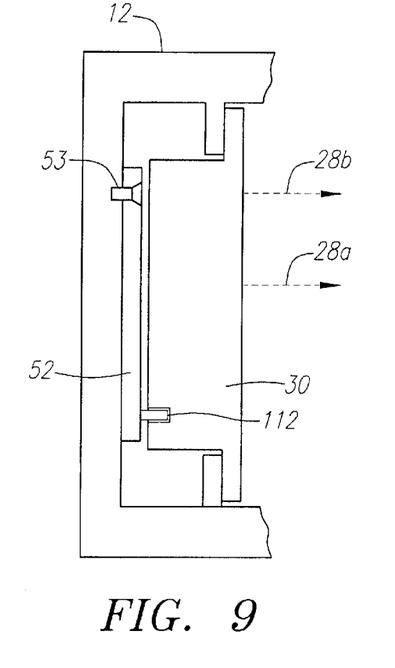
FIG. 9 is a diagrammatic view illustrating a means for aligning an analog board with an optics module according to a preferred embodiment.

Although the optics module 30 of FIG. 1 includes an analog board 52 on which bandpass filters and photodetectors are mounted, the analog board may be an independent component from the optics module 30 and separately mounted to the scanner housing 12. For example, as shown in FIG. 9, the analog board 52 may have holes 53 adapted to receive screws or other suitable fasteners for securing the analog board to the scanner housing 12. Alignment pins 112 may also be used, as already described, to help position the optics module 30 to the analog board 52 such that the collection lenses 48, 50 are aligned properly with photodetectors 88, 89, as well as scanning mechanism 20.

Figure 10:
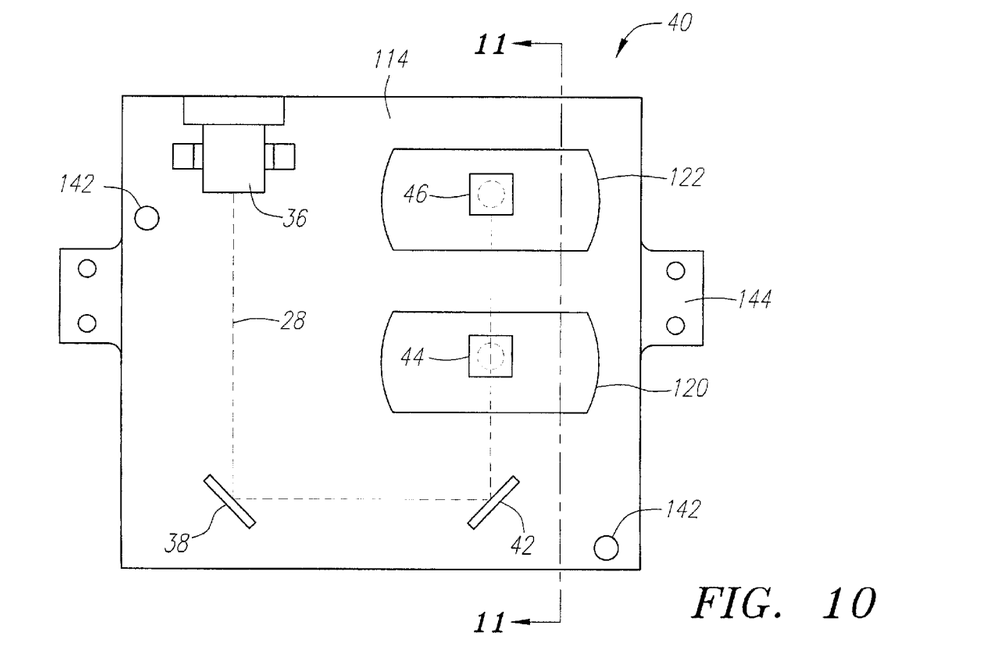
FIG. 10 is a diagrammatic plan view of an integrated optics module according to a second preferred embodiment.
Figure 11:
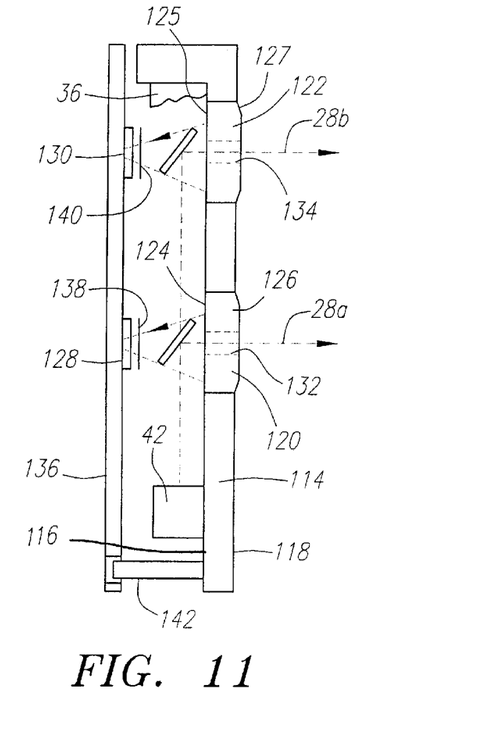
FIG. 11 is a diagrammatic cross-sectional view taken along line 11—11 of the optics module of FIG. 10.

FIGS. 10 and 11 illustrate an alternate optics module 40 according to a second embodiment. The optics module 40 includes a planar optics block 114. The optics block 114 has a first side 116 and a second side 118. The optics block 114 may be made from any suitable material such as metal, or preferably plastic. For example, the optics block 114 may be made from aluminum, or from an optical plastic such as acrylic or polystyrene. If the optics block 114 is made from an optical plastic, then collection lenses 120, 122 may be integrally molded into the optics block 114.

The laser source 36 and routing optics 38, 42, 44, 46 are arranged as in the first embodiment and mounted onto the first side 116 of the optics block 114.

Collection lenses 120, 122 are disposed in the surface of the optics block 114 so that when optics block 114 is mounted to scanner system 10, a pre-selected axis of each collection lens intersects the scanning mechanism 20 in the manner described in the first embodiment. Collection lens 120 includes a first side 124 and a second side 126, and collection lens 122 includes a first side 125 and a second side 127. The first side 124, 125 of each collection lens 120, 122 faces the photodetectors 128, 130, respectively. When the optics module 40 is removably mounted in a scanner system, the second side 126, 127 of each collection lens 128, 130 faces the scanning mechanism 20 (not shown). Collection lenses 120, 122 may be mounted in the surface of the optics block 114 by any suitable fastening means, including, for example, adhesive, epoxy, brackets, clips or screws.

As noted above, where the optics block 114 is made from an optical plastic, the collection lenses 120, 122 may be molded integrally into the optics block 114. Although any method of securing the collection lenses 120, 122 to the optics block 114 may be employed, integrally molding collection lenses in an optics block 114 made from an optical plastic may be preferable in many implementations because it simplifies the construction of the optics module by, among other things, eliminating the need for a collection lens assembly step.

The laser source 36 and the routing mirrors 38, 42 may be mounted to the optics block 114 by any of the mounting means described for any of the other optical components. Similarly, the beam splitter 44 and the fold mirror 46 may be mounted on the first side 124, 125 of the collection lenses 120, 122 in the manner described in the first embodiment. In operation, the light source 36 produces a laser beam 28 which is routed by routing mirrors 38, 42 to the beam splitter 44. The beam splitter 44 splits the laser beam 28 into a first portion and a second portion forming laser beams 28a and 28b, respectively. Simultaneously, beam splitter 44 reflects, or routes, the first portion 28a of the beam through a first center area 132 centrally located in first collection lens 120. The second laser beam portion 28b passes through the beam splitter 44 and is reflected, or routed, by fold mirror 46 through a second center area 134 centrally located in second collection lens 122.

Routing optics 38, 42, 44 are configured to route laser beam 28a through collection lens 120 substantially along the pre-selected axis of collection lens 48. Similarly, routing optics 38, 42, 44 and 46 are configured to route laser beam 28b through collection lens 50 substantially along the pre-selected axis of collection lens 122. Accordingly, when optics module 40 is mounted in housing 12, laser beams 28a and 28b will be routed through collection lenses 48, 50 so that they intersect with the scanning mechanism 20 at their respective predetermined locations.

As in the first embodiment, the pre-selected axis of each collection lens 120, 122 preferably corresponds to its principal axis. The alignment of the exiting laser beams 28a, 28b to the principal axes of the collection lenses 120, 122 is made by adjusting the routing mirrors 38, 42 and/or the laser source 36 as previously described.

The analog board 136, which holds photodetectors 128, 130 and bandpass filters 138, 140, may be mounted to the optics block 114 using any suitable fasteners. The collection area of the photodetectors 128, 130 is disposed to face the first side 124 of the collection lenses 120, 122, respectively. Aligning the photodetectors with the principal axes of the collection lenses may be achieved by use of alignment pins 142 to position the analog board 136 to the optics block 114. In an alternative embodiment, the analog board 136 may be separately mounted to the scanner housing 12 and then be aligned to the optics module 40 via positioning pins 142. Hence, as with the first embodiment, the collection lenses are automatically in position to gather the retrodirective reflected light and focus the returning light through the bandpass filter and onto the photodetector.

The optics module 40 is mounted to the scanner housing 12 such that the second side of the collection lens faces the scanning mechanism 126 and the principal axis of the collection lens intersects the scanning mechanism 20 in a pre-selected manner. By doing so, the exiting beams 28a, 28b, which are aligned to the principal axis of the respective collection lenses, will also intersect the scanning mechanism in the pre-selected manner.

To removably mount the optics module 40 to the scanner housing 12, the optics block 114 includes mounts 144 adapted to receive bolts, screws, or other suitable fasteners. Though mounts 144 comprise two-hole mounts in the illustrated embodiment, any suitable mounting fixtures may be employed. For example, the mounting fixtures described and illustrated in FIGS. 7 and 8 may be used to mount optics module 40 to scanner housing 12.

Therefore, optics modules have been described herein which advantageously partition and arrange various optical components into a discrete replaceable module such that variation in the position of the projected laser from one optics module to the next is minimized or eliminated. By positioning the collection lens or lenses in a predetermined orientation in relation to the scanning mechanism, and aligning the exiting laser beam to the principal, or other pre-selected, axis of the collection lens as herein described, an optics module may be constructed capable of emitting a laser beam to intersect a scanning mechanism at a predetermined location. The optics modules may also align the transmission devices with the collection devices to effectively collect retrodirectively-returning light for processing and decoding.

As the necessary laser beam alignments are performed on the optics module before it is inserted into the scanning system, the need for optical alignment during scanning system assembly is eliminated. Accordingly, a scanning system with a defective laser source may be readily repaired by replacing one optics module with another, and without requiring the services of a trained technician.

Additionally, the optics modules described are not limited by the type of scanning mechanism employed in the optical scanning system. Though a scanning mechanism comprising a rotating polygon mirror and pattern mirror system is shown in FIG. 1, other scanning mechanisms may be utilized. For example, the optical scanning system may include a dithering mechanism that has a mirror displacing in a reciprocating motion to scan a laser beam. In such a configuration, as long as the scanning system is provided with the proper mounting fixture interfaces, optics modules may be interchangeably used in the same manner as described in the preferred embodiment.

Moreover, as stated above, the optics module is not limited to producing two exiting laser beams. Rather, a greater or lesser number of exiting beams may be produced, as required by a given system. For example, referring to optics module 30, exiting beam 28b may be disabled by simply replacing the beam splitter 44 with a fold mirror.

Finally, though the optical scanning system 10 illustrated in FIG. 1 uses both exiting laser beams to generate a scan pattern, this configuration is not required. For example, one laser beam may be used to generate a scan pattern while the second beam may be used as a pointer or for some other function.

Additional advantages and modifications will readily occur to those skilled in the art. The invention in its broader aspects is not, therefore, limited to the specific details, representative methods, and illustrative examples shown and described. Accordingly, departures may be made from such details without departing from the spirit and scope of applicant's general inventive concepts.

What is claimed is:

1. An optics module for an optical code scanner, the scanner having a polygon scan mirror for generating a scan pattern and for directing return light reflected from an optical code toward the optics module, the optics module comprising:
   an optics block;
   a laser source mounted on the optics block for emitting a laser beam along an outgoing path;
   a collection lens disposed on a surface of the optics block in the outgoing path for collecting return light reflected from the polygon scan mirror;
   routing optics mounted on the optics block in the outgoing path between the laser source and the collection lens, the routing optics arranged for receiving the laser beam from the laser source and directing the laser beam through the collection lens toward the polygon scan mirror substantially along a pre-selected axis of the collection lens;
   an analog board mounted on the optics block, the analog board having a photodetector mounted thereon positioned to receive return light transmitted through the collection lens; and
   mounting connectors on the optics block configured to removably mount the optics module to the scanner in a fixed position such that (a) the polygon scan mirror is located and precisely aligned in the second optical path for receiving the laser beam and scanning the laser beam over a scan angle and (b) the collection lens is located and precisely aligned with respect to the polygon scan mirror for collecting return light reflected from the polygon scan mirror.

2. An optics module according to claim 1, wherein the optics block is made of an optical plastic and the collection lens is integrally molded with the optics block.

3. An optics module according to claim 1, wherein the pre-selected axis corresponds to a principal axis of the collection lens.

4. An optics module for an optical code scanner, the scanner having a scanning mechanism for generating a scan pattern and for directing return light reflected from an item being scanned, the optics module comprising:
   an-optics block;
   a laser source mounted on the optics block for emitting a laser beam along a first outgoing path;
   routing optics mounted on the optics block in the first outgoing path for receiving the laser beam and directing the laser beam along a second outgoing path;
   a first collection element disposed on a surface of the optics block in the second outgoing path, the first collection element including a center area through which the routing optics direct the laser beam out along the second outgoing path; and
   mounting connectors on the optics block configured to removably mount the optics module to the scanner in a fixed position such that (a) the scanning mechanism is located and precisely aligned in the second optical path for receiving the laser beam and scanning the laser beam over a scan angle and (b) the first collection element is located and precisely aligned with the scanning mechanism for collecting return light reflected from the scanning mechanism.

5. An optics module according to claim 4, wherein the laser source comprises a laser diode.

6. An optics module according to claim 4, wherein the routing optics are aligned to direct the laser beam through the first collection element substantially along a principal axis of the first collection element.

7. An optics module according to claim 4 further comprising an analog board mounted on the optics block, the analog board having a photodetector mounted thereon positioned to receive return light collected from the first collection element.

8. An optics module according to claim 4, wherein the photodetector is positioned approximately at a principal focus point of the first collection element.

9. An optics module according to claim 4, wherein the optics block is made of an optical plastic and the first collection element comprises a collection lens integrally molded with the optics block.

10. An optics module according to claim 9, wherein the optics block is made from a material selected from the group consisting of: acrylic and polystyrene.

11. An optics module according to claim 4, wherein the optics block is made of aluminum.

12. An optics module according to claim 4, wherein the optics block comprises a fold mirror disposed behind the collection element for reflecting the laser beam out through the center area, and wherein the collection element and the fold mirror are integrally molded with the optics block.

13. An optics module according to claim 4 further comprising a second collection element disposed on the surface of the optics block such that the second collection element is aligned with the scanning mechanism for collecting return light reflected from the scanning mechanism when the optics module is mounted to the scanner.

14. An optics module according to claim 13 wherein the routing optics are configured to split the laser beam into a first beam portion that is directed through the center area of the first collection element, and a second beam portion that is directed through a center area of the second collection element.

15. An optics module according to claim 14, wherein the routing optics include a beam splitter disposed in the first outgoing path for forming the first beam portion and the second beam portion.

16. An optics module according to claim 4, wherein the center area of the first collection element comprises a collection lens, the collection lens comprising a focusing lens element aperture formed concentrically with a principal axis of the collection lens.

17. An optical scanning system for scanning a laser beam toward an item to be scanned and for collecting return laser light reflected from the item, comprising:
   a housing at least partially enclosing an interior;

a window disposed in the housing;

mounting fixtures on the interior of the housing;

an interchangeable optics module comprising
- an optics block,
- a laser source mounted on the optics block for producing a laser beam,
- routing optics mounted on the optics block for routing the laser beam along an outgoing optical path, and
- a collection element mounted on the optics block for collecting laser light reflecting off the item,
- connectors on the optics block for removably mounting the optics module onto the mounting fixtures;

a plurality of pattern mirrors mounted in the interior of the housing;

a scanning mechanism, mounted in the interior of the housing and positioned in the outgoing optical path of the laser beam for scanning the laser beam across the pattern mirrors for projecting a scan pattern out through the window, wherein the optics module is constructed and arranged such that when the optics module is mounted onto the mounting fixtures, (a) the laser source and routing optics of the optics module optically align the laser beam along the optical path onto the scanning mechanism at a proper angle and position; and (b) the collection element is optically aligned with the scanning mechanism for receiving laser light reflected from the item being scanned.

18. An optical scanning system according to claim 17, wherein the collection element comprises a collection lens disposed on a surface of the optics block such that a pre-selected axis of the collection lens intersects the scanning mechanism at a predetermined location.

19. A scanner according to claim 18 further comprising an analog board including a photodetector mounted thereon, the analog board mounted within the interior of the housing such that the photodetector is positioned at a predetermined distance from the collection lens along the pre-selected axis of the collection lens.

20. A scanner according to claim 19 wherein the analog board is mounted on the optics block.

21. A scanner according to claim 19, wherein the photodetector is positioned approximately at a principal focus point of the collection lens.

22. A scanner according to claim 18, wherein the pre-selected axis corresponds to a principal axis of the collections lens.

23. A scanner according to claim 17, wherein the optics block is made of an optical plastic and the collection element is integrally molded with the optics block.

24. A scanner according to claim 18, wherein the collection element includes a central aperture formed concentrically with the pre-selected axis of the collection element.

25. A scanner according to claim 24 wherein the routing optics include a fold mirror disposed behind the collection element for reflecting the laser beam through the aperture.

26. A method of replacing a first optics module in an optical scanner with a second optics module, the scanner including a housing, a scanning mechanism mounted in the housing, and mounting fixtures mounted in the housing, comprising the steps of:

accessing the first optics module;

removing the first optics module from the mounting fixtures;

providing the second optics module with optical components including a light beam source, beam routing optics and a collection element which are pre-aligned prior to installation of the second optics module into the scanner;

removably mounting the second optics module onto the mounting fixtures, the mounting fixtures aligning the second optics module with the scanning mechanism without requiring additional alignment of optical components of the scanner.

27. A method according to claim 26 further comprising mounting a printed circuit board onto the second optics module prior to installation of the second optics module into the scanner, the printed circuit board having a detector thereon, in alignment with the collection element.

28. A method of constructing an interchangeable optics module for an optical scanner, comprising the steps of providing the scanner with a housing, a scanning mechanism disposed in the housing, and internal module mounting fixtures disposed within the housing;

providing the optics module with an optics block having complementary external mounting fixtures configured to removably mount to the internal module mounting fixtures in the housing;

mounting a laser source onto the optics block, the laser source adapted to generate a laser beam along an optical path;

mounting routing optics onto the optics block in the optical path;

mounting a collection lens having an aperture therethrough onto the optics block;

pre-aligning the routing optics with the laser source and the collection lens prior to installation of the optics block into the housing, such that the routing optics are adapted to receive a laser beam from the laser source and direct the laser beam out through the aperture in the collection lens at a predetermined angle and location onto the scanning mechanism when the optics module is installed in the housing.

29. A method according to claim 28 wherein the step of mounting a collection lens comprises integrally molding the collection element with the optics block.

30. A method according to claim 28 further comprising the step of mounting the optics module onto the mounting fixtures in the scanner, the mounting fixtures aligning the optics module with the scanning mechanism.

* * * * *

UNITED STATES PATENT AND TRADEMARK OFFICE
CERTIFICATE OF CORRECTION

PATENT NO. : 6,578,765 B2
DATED : June 17, 2003
INVENTOR(S) : Paul R. Huss et al.

It is certified that error appears in the above-identified patent and that said Letters Patent is hereby corrected as shown below:

Column 11,
Line 61, "an-optics" should read -- an optics --.

Column 13,
Lines 47-48, "collections" should read -- collection --.

Signed and Sealed this

Twenty-ninth Day of June, 2004

JON W. DUDAS
*Acting Director of the United States Patent and Trademark Office*